(12) United States Patent
Hitsman

(10) Patent No.: US 10,266,364 B2
(45) Date of Patent: Apr. 23, 2019

(54) STRAP WINDER

(71) Applicant: John Hitsman, Ottawa (CA)

(72) Inventor: John Hitsman, Ottawa (CA)

(73) Assignee: 2204217 Ontario Inc., Ottawa (CA)

( * ) Notice: Subject to any disclaimer, the term of this patent is extended or adjusted under 35 U.S.C. 154(b) by 284 days.

(21) Appl. No.: 15/530,393

(22) Filed: Jan. 10, 2017

(65) Prior Publication Data
US 2018/0194589 A1    Jul. 12, 2018

(51) Int. Cl.
*B65H 54/58*    (2006.01)
*B60P 7/08*    (2006.01)

(52) U.S. Cl.
CPC .......... *B65H 54/585* (2013.01); *B60P 7/0846* (2013.01); *B65H 2701/375* (2013.01)

(58) Field of Classification Search
CPC ... B65H 2701/375; B60P 7/0846; B60P 7/083
See application file for complete search history.

(56) References Cited

U.S. PATENT DOCUMENTS

| | | | | |
|---|---|---|---|---|
| 3,946,964 A * | 3/1976 | Zinser | ...................... | A62C 33/04 |
| | | | | 242/532.6 |
| 4,311,288 A * | 1/1982 | Galland | ................. | B60P 7/0846 |
| | | | | 242/399 |
| 4,390,141 A * | 6/1983 | Webster | ................... | B60P 7/083 |
| | | | | 242/395 |
| 4,717,086 A * | 1/1988 | Crow | .................... | A01K 89/003 |
| | | | | 242/394.1 |
| 6,015,111 A * | 1/2000 | Berke | .................. | A01K 89/003 |
| | | | | 242/250 |
| 6,352,215 B1* | 3/2002 | Cash | ........................ | B21C 47/30 |
| | | | | 242/574.2 |
| 7,017,847 B2* | 3/2006 | Treat | ..................... | B60P 7/0846 |
| | | | | 242/395 |
| 7,766,271 B1* | 8/2010 | Confoey | ............... | B60P 7/0846 |
| | | | | 24/68 CD |
| 9,908,454 B1* | 3/2018 | Waters, Jr. | ............ | B60P 7/0846 |
| 10,000,148 B1* | 6/2018 | Haynes | ................. | B60P 7/0846 |
| 10,081,521 B2* | 9/2018 | Nipper | ..................... | B66D 3/04 |
| 2004/0089761 A1* | 5/2004 | Tsao | ........................ | A62C 33/04 |
| | | | | 242/530.2 |
| 2013/0206895 A1* | 8/2013 | Van Benthem | ....... | B60P 7/0846 |
| | | | | 242/532.6 |
| 2014/0061556 A1* | 3/2014 | Knox | ...................... | B60P 7/083 |
| | | | | 254/220 |
| 2017/0113597 A1* | 4/2017 | Hitsman | .............. | B65H 54/585 |
| 2018/0194589 A1* | 7/2018 | Hitsman | ............... | B60P 7/0846 |

* cited by examiner

*Primary Examiner* — Michael E Gallion
(74) *Attorney, Agent, or Firm* — George A. Seaby

(57) ABSTRACT

A compact, portable strap winder includes a housing, a shaft having an outer reel section rotatable in the housing, a positioner for controlling movement of the shaft in the housing, whereby the reel section extends out of the housing for receiving a strap or the shaft is releasably stored in the housing. A handle is provided on the outer end of the shaft for rotating the shaft. The handle can be removed from the shaft and stored in a pocket in the housing.

8 Claims, 7 Drawing Sheets

US 10,266,364 B2

STRAP WINDER

This invention relates to a portable strap winder.

The strap winder of the present invention is primarily intended for winding straps of any width, e.g. one to two inch wide straps. However, the winder can also be used to wind string or even short lengths of rope.

BACKGROUND OF THE INVENTION

Every year tons if not hundreds of thousands of tie down straps are sold. When not in use the tie down straps are commonly stored loose in the trunk of a car or in the back of a truck. The result is a messy bundle, which must be unraveled and straightened before being used again.

Strap winders are by no means new. For example, Canadian Patent Application No. 2,651,735 discloses a tie down dispenser for a single tie down strap. U.S. Pat. No. 1,199,790, issued to W. H. Holcomb on Oct. 3, 1916; U.S. Pat. No. 5,433,565, issued to Mee P. Chan on Jul. 18, 1995; U.S. Pat. No. 6,179,534, issued to Jerry R. Weckter on Jan. 30, 2001 and U.S. Pat. No. 6,729,604, issued to Kenneth D. Claycomb on May 4, 2004 disclose a variety of strap or tape winding and carrying devices, all of which are intended to use with a single strap. For the most part, the devices in these publications are intended for use on a truck.

SUMMARY OF THE INVENTION

The strap winder of the present invention is a simple, compact, portable apparatus designed which can easily be produced using molded plastic components. The strap winder can be easily assembled and disassembled for storage or transport.

The strap winder of the present invention includes housing; a shaft rotatable in a socket in the housing; the shaft being slidable in the socket between an inner storage position in the housing and an outer, extended position in which an outer, reel section of the shaft extends out of the housing for receiving a strap; and a handle for removable mounting on the outer end of the shaft for rotating the latter during winding of the strap thereon.

Another feature of the invention is a positioner on the inner end of the shaft for releasably positioning the shaft in the socket in a storage position or in one of a plurality of use positions.

Yet another feature of the invention is a pocket in the housing for storing the handle. With the shaft stored in the housing and the handle separated from the shaft and stored in the pocket, the result is a compact, portable assembly. A hole through the top of the housing defines a handle for manual carrying of the strap winder.

BRIEF DESCRIPTION OF THE DRAWINGS

The invention is described below in greater detail with reference to the drawings, which illustrate a preferred embodiment of the invention, and wherein.

DETAILED DESCRIPTION OF THE INVENTION

Figure 1:
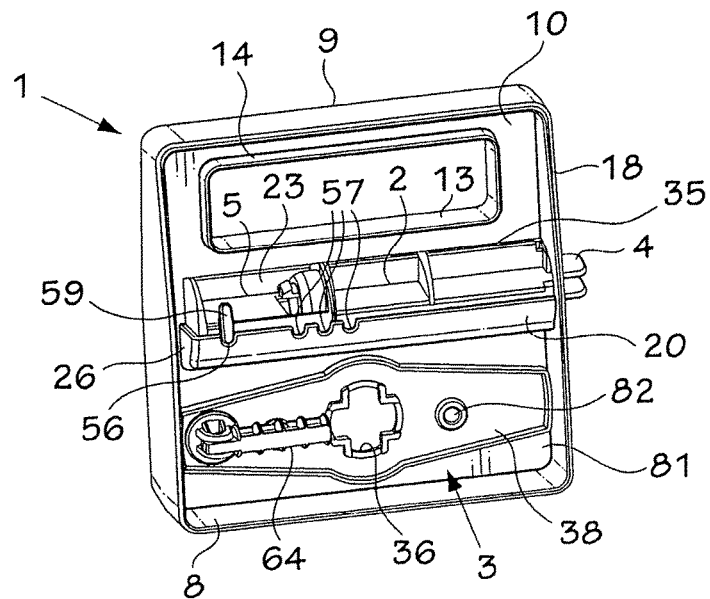
FIG. 1 is an isometric view of the strap winder in the transport or storage condition.
Figure 2:
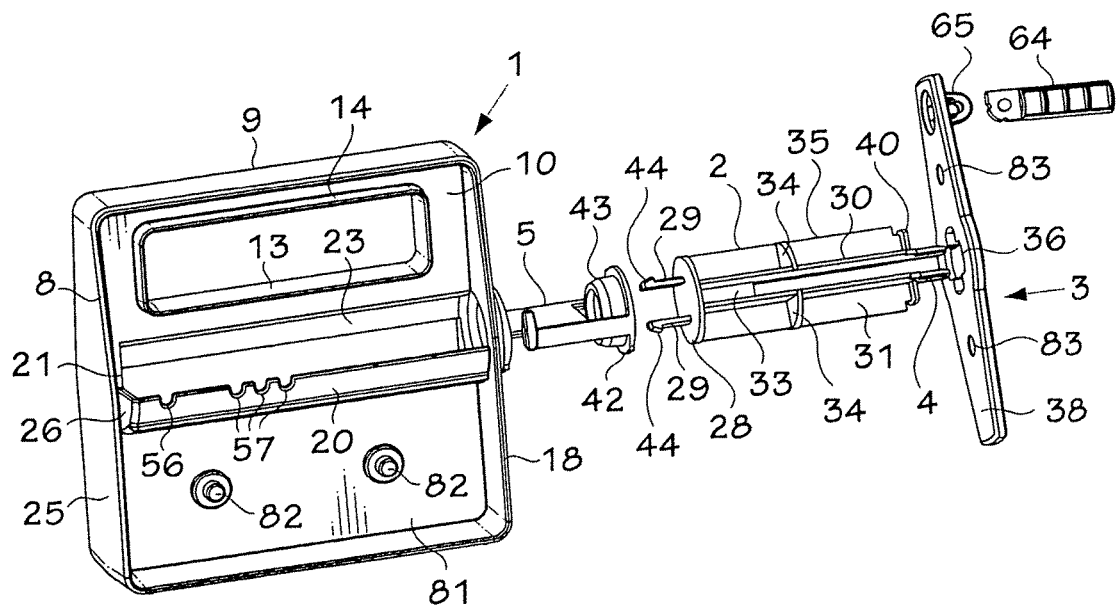
FIG. 2 is an exploded, isometric view of the strap winder of FIG. 1.
Figure 3:
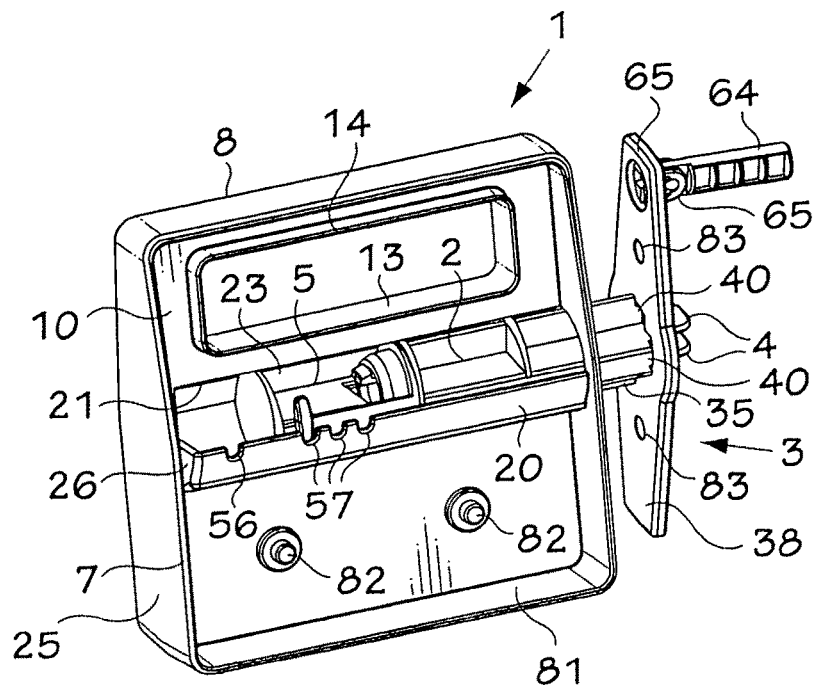
FIG. 3 is a isometric view of FIGS. 1 and 2 in an assembled, use position.

With reference to FIGS. 1 to 3, the basic elements of the strap winder include a rectangular housing indicated generally at 1, a shaft 2 slidably and rotatably mounted in the housing; a handle 3 for removably mounting on outer ends 4 of the shaft 2 for rotating the latter; and a positioner on the inner end of the shaft 2 for releasably locking the shaft in one of a plurality of positions in the housing 1.

Figure 4:
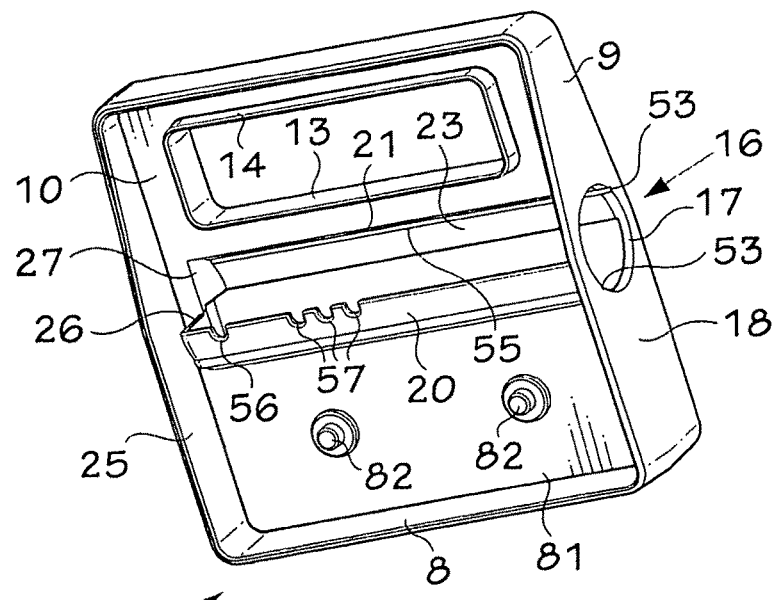
FIG. 4 is an isometric view of one side of a housing used in the strap winder of FIGS. 1 to 3.
Figure 7:
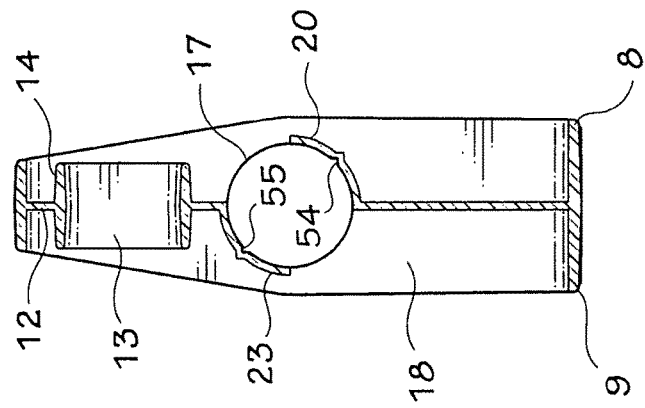
FIG. 7 is a cross section taken generally along line 7-7 of FIG. 5.
Figure 5:
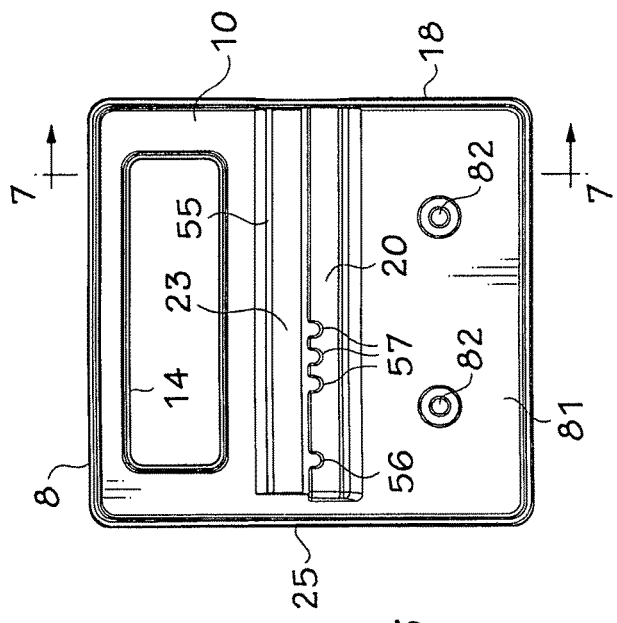
FIG. 5 is a front view of the housing of FIG. 4.

As best illustrated in FIGS. 4 and 5, the housing 1 is defined by a planar body 7 and flanges 8 and 9 extending outwardly from the periphery of both front and rear sides 10 and 11, respectively of the housing 1. A rectangular opening 13 in the upper end of the housing 1 and flanges 14 surrounding the opening define a handle for manual carrying of the strap winder. A socket indicated generally at 16 (FIG. 4) slidably receives the shaft 2 and the shaft positioner 5, both of which are inserted into the socket 16 through a circular opening 17 in one end 18 of the housing 1. The socket 16 is defined by the opening 17 an arcuate trough 10 extending outwardly and upwardly from the bottom of a central rectangular opening 21 (FIGS. 2 to 4) in the housing 1, and an arcuate ledge 23 extending outwardly and downwardly from the top of the opening 21 on the rear side 11 of the housing 1 opposite the trough 20. The trough 20 and the ledge 23 are quarter cylinders, i.e. have the shape which would be achieved by cutting a tubular cylinder longitudinally into quarters. The trough 20 and the ledge 23 extend from inside the end 18 of the housing containing the opening 17 to a location proximate the other end 25 of the housing. End walls 26 and 27 are provided on the inner ends of the trough 20 and the ledge 23, respectively.

Figure 8:
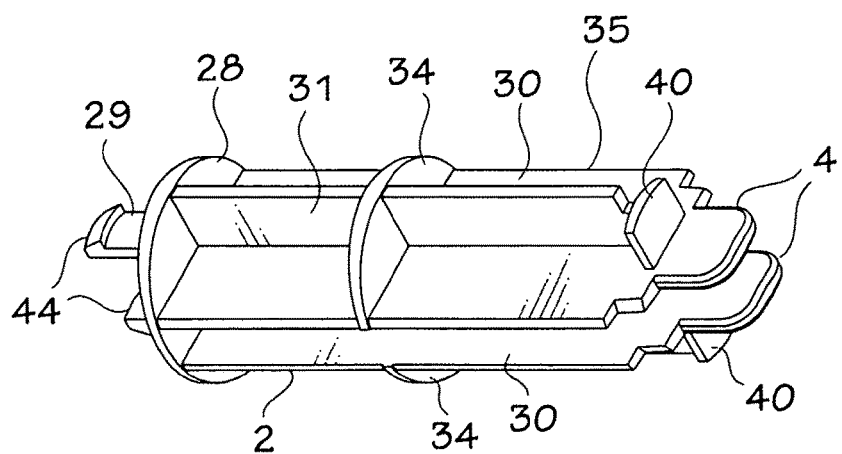
FIG. 8 is an isometric view of a shaft used in the strap winder of FIGS. 1 to 3.
Figure 9:
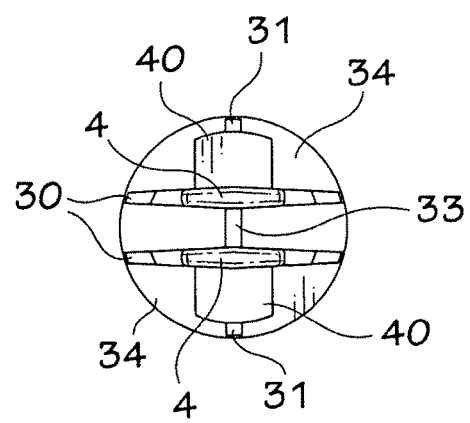
FIG. 9 is an end view of the shaft of FIG. 8.
Figure 10:
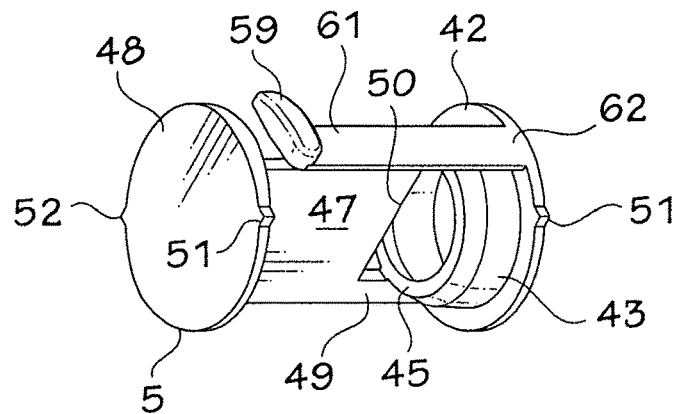
FIG. 10 is an isometric view of a shaft positioner used in the strap winder of FIGS. 1 to 3.
Figure 11:
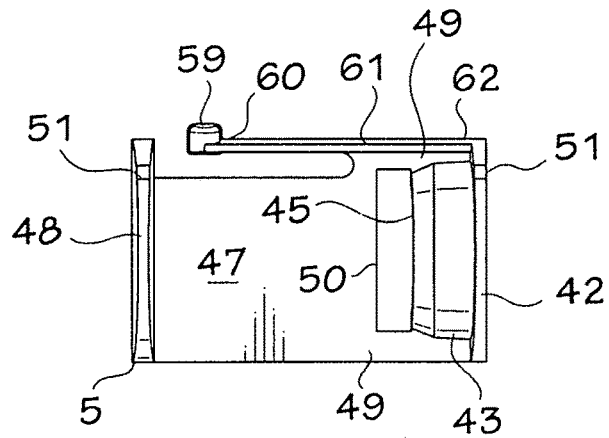
FIG. 11 is a top view of the positioner of FIG. 10.
Figure 12:
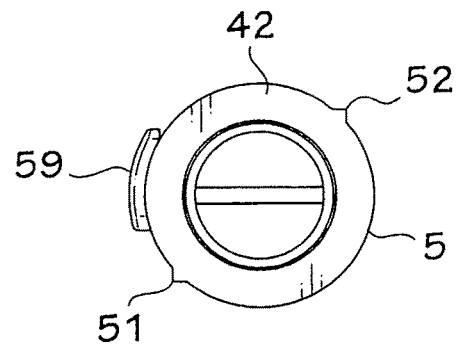
FIG. 12 is an end view of the positioner of FIG. 10.

As best shown in FIGS. 2, 8 and 9, the shaft 2 includes a disc-shaped inner end 28 with hook-shaped prongs 29 extending outwardly from one side thereof for connecting the shaft 2 to the positioner 5. Two spaced apart planar arms 30 extending outwardly from the other side of the end 28. Reinforcing strips 31 extend longitudinally from the end 28 of the shaft outwardly to proximate the other ends 4 of the arms 31. A short reinforcing strip 33 extends from the end 28 between the arms 30, and a semi-circular reinforcing rib 34 is provided on the outside of each arm 31. The portion of the shaft 2 outwardly of the ribs 34 defines a reel section 35 for receiving a strap to be wound on the shaft. The outer free ends 4 of the arms 31 define fingers for insertion into a central, cruciform-shaped opening 36 in a handle plate 38.

The outer ends 4 of the arms 31 can flex toward each other for insertion into opposed arms 39 of the opening 36. A pair of ears 40 extend into opposite arms of the handle plate 38 to position the shaft in the plate and cause the shaft to rotate with the plate.

As best shown in FIGS. 2 and 10 to 12 the positioner 5 includes an annular outer end 42 with a sleeve 43 extending inwardly therefrom for receiving and retaining the prongs 29 on the inner end 28 of the shaft 2. When the inner end 28 of the shaft 2 is pushed into the sleeve 43, the prongs 29 flex toward each other and, once the hook ends 44 of the prongs 29 pass the inner end 45 of the sleeve 43 the prongs spring apart to hook onto the inner end of the sleeve. The prong connection permits rotation of the shaft 2 relative to the positioner 5.

A laminated plate 47 extends inwardly from the outer end 42 of the positioner 5 to a disc-shaped inner end 48. The plate 47 includes legs 49 (one shown) connected to the annular outer end 42 of the positioner 5, and a rectangular groove 50 between the legs 49, permitting unobstructed entry of the prongs 29 into the positioner.

Figure 6:
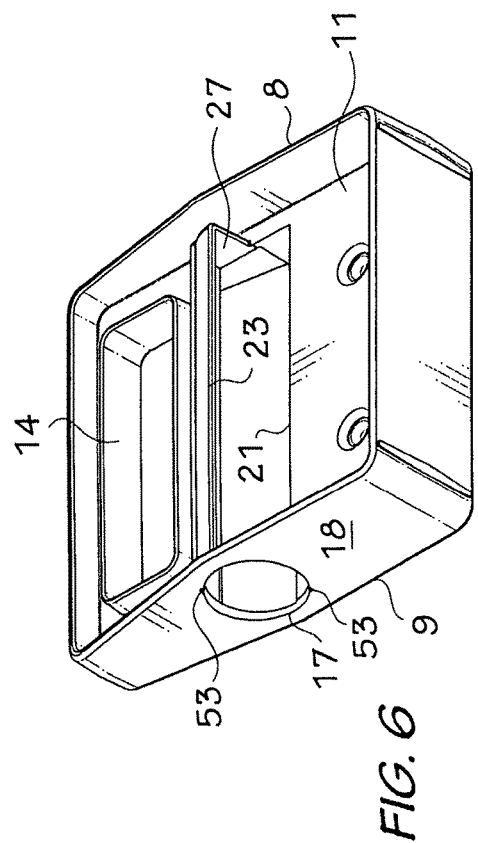
FIG. 6 is an isometric view of the housing of FIGS. 4 and 5 as viewed from the rear.

While the positioner is slidable in the socket 16, it is not free to rotate. To this end, two diametrically opposed V-shaped projections 51 and 52 are provided on each of the outer end 42 and the inner end 48 of the positioner. When the shaft 2 is slid into the socket 16, the projections 51 and 52 slide in diametrically opposed V-shaped notches 53 (FIG. 6) in the opening 17 in the end 18 of the housing 1, and in grooves 54 and 55, respectively extending longitudinally of the trough 20 and the ledge 23, respectively.

A detent releasably retains the positioner 5 and thus the shaft 2 in one of a plurality of positions including the storage position shown in FIG. 1 and one of three use positions (one shown in FIG. 3). The detent is defined by spaced apart notches 56 and 57 (FIGS. 1 to 3) in the top, outer edge of the trough 58; and a finger 59 on the inner free end 60 of an arm 61 on the positioner 5. The outer end 62 (FIGS. 10 and 11) of the arm 61 is connected to the annular outer end 42 of the positioner 5 and extends most of the length of the positioner.

Figure 13:
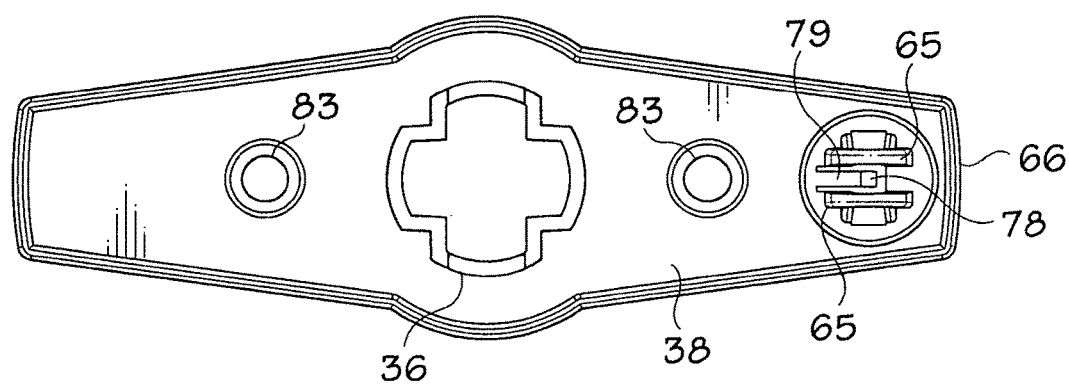
FIG. 13 is a front view of a handle plate used in the strap winder of FIGS. 1 to 3.
Figure 14:
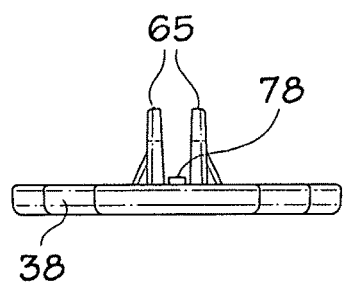
FIG. 14 is an isometric view of the handle plate of FIG. 13.
Figure 15:
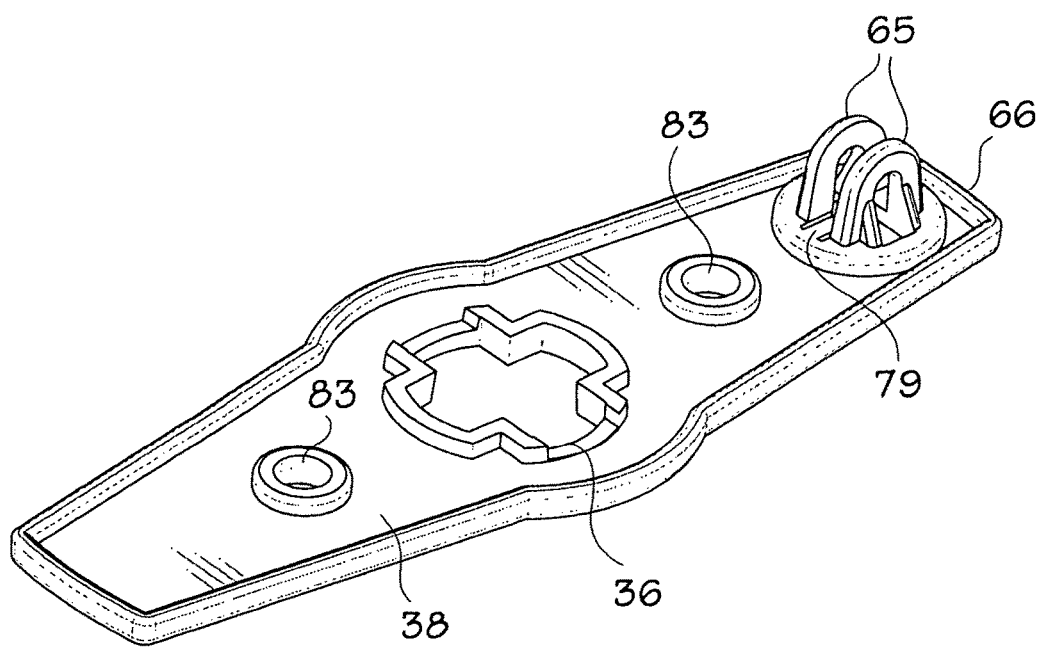
FIG. 15 is an end view of the plate of FIGS. 13 and 14.
Figure 16:
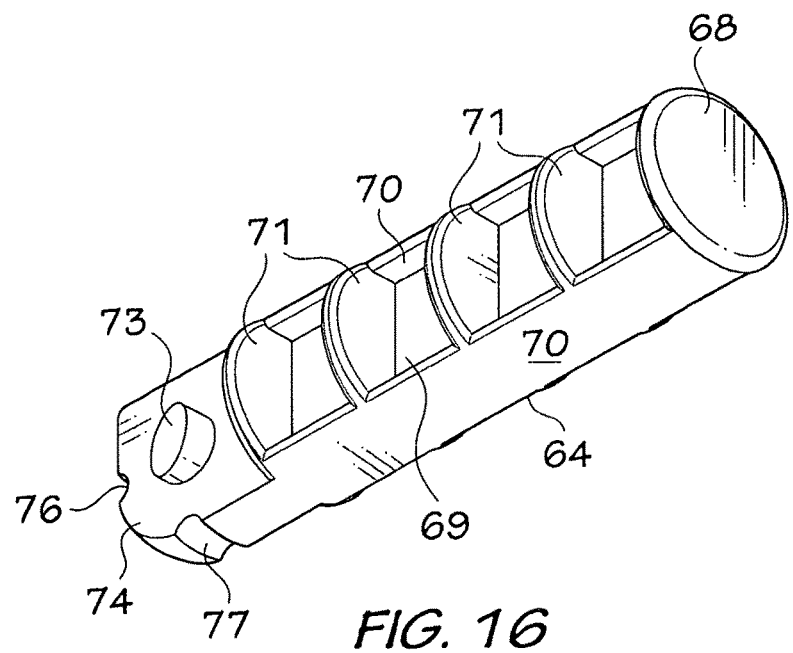
FIG. 16 is an isometric view of a handle arm used in the strap winder of FIGS. 1 to 3.

With reference to FIGS. 13 to 15 as well as the plate 38, the handle 3 includes an arm 64 pivotally mounted between posts 65 extending outwardly from one end 66 of the plate. The arm 64 includes a disc-shaped outer end 68, a planar body 69, sides 70 and reinforcing ribs 71 extending between the sides. Stub axles 73 (one shown) are provided on the inner end 74 of the arm 64 for pivotally mounting the arm on the plate 38. A detent releasably retains the arm 64 in a storage position (FIG. 1) folded against the plate 38 or an extended, use position (FIGS. 2 and 3) for rotating the shaft 2. The detent 74 is defined by a pair of notches 76 and 77 in the inner end 74 of the arm 64, and a post 78 (FIG. 13) jutting outwardly from one end of a flexible finger 79 in the plate 38 between the posts 65. As shown in FIG. 1, with the arm 64 folded against the plate 38, the handle 3 is stored in a pocket 81 in the housing 1. In the stored position, the handle 3 is mounted on posts 82 in the pocket. For such purpose, holes 83 are provided in the handle plate 38.

When a strap (not shown) is to be wound on the reel section 35 of the shaft 2, the handle 3 is removed from the pocket 81 and placed on the outer ends 4 of the shaft 2. The arm 64 of the handle 3 is pivoted outwardly to the use position shown in FIGS. 2 and 3. The shaft 2 is then pulled outwardly from the stored position (FIG. 1) to one of three use positions (FIG. 3). When shaft 2 is pulled outwardly, the end 60 of the arm flexes inwardly to release the finger 59 from the notch 56. Continued outward movement of the shaft 2 successively aligns the finger 59 with the notches 57.

For a narrow strap, pulling on the shaft is stopped when the finger 59 enters the notch 57 nearest the notch 56 and, for the widest strap, movement of the shaft 2 is stopped when the finger 59 snaps into the notch 57 farthest from the notch 56. Typically, the straps to be wound on the shaft are 1 inch, one and one-half inches and two inches wide. As the shaft 2 moves outwardly, the gap between the end 18 of the housing 1 and the handle plate 38 changes, i.e. the length of shaft reel section 35 available to receive a strap becomes larger. A strap is wound on the shaft 2 by holding a free end of the strap on the reel section 35 and rotating the shaft to start a roll of strap. After a couple of revolutions of the shaft 2, the length of strap on the reel can be released and rotation of the shaft continues to form a complete roll of strap. By removing the handle 3 from the shaft 2, the roll of strap can be removed from the strap.

The invention claimed is:

1. A portable strap winder comprising a housing; a socket in the housing; a shaft rotatable in said socket including an outer reel section for forming a roll of strap when the strap is wound thereon during rotation of the shaft; a positioner connected to an inner end of the shaft for releasably locking the shaft in an inner, storage position in which the shaft is completely inside the housing with the exception of an outer end, and an outer use position in which the reel section of the shaft is outside of the housing for receiving a strap; a handle for removable mounting on the outer end of the shaft for rotating the shaft to form the roll of strap on the reel section of the shaft; and a pocket in a front side of housing for storing the handle in a storage position.

2. The strap winder of claim 1, wherein the shaft is rotatable relative to the positioner in the use position of the shaft.

3. The strap winder of claim 2, wherein the socket extends from a first end of the housing to proximate a second end of the housing.

4. The strap winder of claim 3, wherein the socket includes an opening in said first end of the housing; a central opening extending between front and rear sides and between the first and second ends of the housing; a quarter cylinder trough extending outwardly and upwardly from a bottom edge of the central opening on the front side of the housing; and a quarter cylinder ledge extending outwardly and downwardly from a top edge of the central opening on a rear side of the housing.

5. The strap winder of claim 4, wherein the handle includes a plate for mounting on said outer end of the shaft, and an arm pivotally mounted on an outer end of said plate for rotation between a stored position parallel to and against said plate and a use position in which the arm extends outwardly perpendicular to the plate.

6. The strap winder of claim 5 including a central opening in said handle plate; and resilient fingers on an outer end of said shaft for insertion into said central opening to releasably connect the handle to the shaft.

7. The strap winder of claim 6 including a pair of resilient prongs on an inner end of said shaft; and a sleeve on an outer end of said positioner for receiving said prongs to connect the shaft to the positioner.

8. The strap winder of claim 6, wherein said quarter cylinder trough includes a plurality of spaced apart notches in a top, outer edge of said trough; said positioner includes an arm extending inwardly from said sleeve, said arm having a resilient free inner end; and a finger on said free end of the arm for mating with one of said notches for releasably retaining said shaft in a storage position in said housing or in one of a plurality of use positions in which said reel section of said shaft extends out of the housing.

\* \* \* \* \*